US007088077B2

(12) United States Patent
Nagashima et al.

(10) Patent No.: US 7,088,077 B2
(45) Date of Patent: Aug. 8, 2006

(54) POSITION-SENSORLESS CONTROL OF INTERIOR PERMANENT MAGNET MACHINES

(75) Inventors: James M. Nagashima, Cerritos, CA (US); Khwaja M. Rahman, Torrance, CA (US); Nitinkumar R. Patel, Cypress, CA (US); Steven E. Schulz, Torrance, CA (US); Terence G. Ward, Redondo Beach, CA (US); Stanley K. Fujii, Torrance, CA (US)

(73) Assignee: General Motors Corporation, Detroit, MI (US)

(*) Notice: Subject to any disclaimer, the term of this patent is extended or adjusted under 35 U.S.C. 154(b) by 40 days.

(21) Appl. No.: 10/984,178

(22) Filed: Nov. 9, 2004

(65) Prior Publication Data

US 2006/0097702 A1    May 11, 2006

(51) Int. Cl.
*H02P 9/00* (2006.01)
*H02P 7/00* (2006.01)
(52) U.S. Cl. .......................... 322/37; 322/20; 318/432
(58) Field of Classification Search ............... 322/20, 322/22, 23, 24, 25, 29, 37; 318/432, 701
See application file for complete search history.

(56) References Cited

U.S. PATENT DOCUMENTS

| 5,569,995 | A   | * | 10/1996 | Kusaka et al. .............. 318/717 |
|-----------|-----|---|---------|-------------------------------------|
| 5,739,664 | A   | * | 4/1998  | Deng et al. ................. 318/808 |
| 6,344,725 | B1  | * | 2/2002  | Kaitani et al. .............. 318/700 |
| 6,407,531 | B1  | * | 6/2002  | Walters et al. .............. 318/805 |
| 6,741,060 | B1  | * | 5/2004  | Krefta et al. ............... 318/727 |
| 6,762,573 | B1  | * | 7/2004  | Patel .......................... 318/254 |
| 6,763,622 | B1  | * | 7/2004  | Schulz et al. .............. 318/700 |
| 6,924,617 | B1  | * | 8/2005  | Schulz et al. .............. 318/701 |
| 7,015,667 | B1  | * | 3/2006  | Patel et al. ................. 318/432 |
| 2003/0052561 | A1 |   | 3/2003  | Rahman et al. |
| 2003/0164655 | A1 |   | 9/2003  | Biais et al. |
| 2003/0173852 | A1 |   | 9/2003  | Biais et al. |
| 2003/0209950 | A1 |   | 11/2003 | Biais et al. |

* cited by examiner

*Primary Examiner*—Nicholas Ponomarenko
(74) *Attorney, Agent, or Firm*—Christopher DeVries

(57) ABSTRACT

A method of controlling an IPM machine having a salient rotor. Stator terminal signals are measured and rotated to obtain synchronous reference frame current signals. A rotor position is estimated based on an impedance generated using the rotor and included in the current signals. The estimated rotor position is used to control the machine. An alternator-starter system in which this method is used can provide high cranking torque and generation power over a wide speed range while providing operational efficiency.

18 Claims, 5 Drawing Sheets

POSITION-SENSORLESS CONTROL OF INTERIOR PERMANENT MAGNET MACHINES

CROSS-REFERENCE TO RELATED APPLICATIONS

This application is related to U.S. patent application Ser. No. 10/984,269, filed Nov. 9, 2004, entitled, "Start-Up And Restart Of Interior Permanent Magnet Machines". The disclosure of the above application is incorporated herein by reference.

FIELD OF THE INVENTION

The present invention relates generally to interior permanent magnet (IPM) machines and, more particularly to control of IPM machines without using a position sensor to estimate rotor position.

BACKGROUND OF THE INVENTION

Alternator-starter systems may be used in vehicles to provide engine cranking for engine starts and also to generate power for vehicle electrical auxiliary loads (also known as hotel loads). In some engines, gas consumption and emissions are reduced by "on-and-off" operation, that is, by turning the engine on and off based on emission and gas consumption. Such engines may need repeated starting, for example, during urban stop-and-go operation. Starting torque for an engine typically needs to be much higher, although of shorter duration, than torque for driving the vehicle. On the other hand, generating power needs to be provided over a wide engine operating range, from engine idle speed to engine maximum speed.

Several alternator-starter systems are commercially available. Such systems may be based, for example, on modified conventional Lundell alternators, induction machines, switched reluctance machines, or strong-flux IPM machines. Such systems can have drawbacks. For example, some Lundell-based alternators can suffer from poor efficiency. Induction machine-based systems may provide poor torque density and may have difficulty providing generation power over a wide speed range. Switched reluctance systems also can provide poor torque density and operational efficiency and can have thermal drawbacks. While some permanent magnet systems offer good torque density, high spin loss associated with high magnet flux can detract from their operational efficiency at high speeds. If electrical faults occur, the reliability of such systems also can be reduced.

SUMMARY OF THE INVENTION

The present invention, in one embodiment, is directed to a method of controlling an IPM machine having a rotor and a stator. Stator terminal signals are measured to obtain measured signals. The measured signals are rotated to obtain synchronous reference frame current signals. A rotor position is estimated based on an impedance generated using the rotor and included in the current signal, and the estimated rotor position is used to control the machine.

In another embodiment, the invention is directed to a method of providing cranking torque and power generation for an engine-powered vehicle using an alternator-starter system. Stator terminal signals of an IPM machine of the alternator-starter system are measured and vector-rotated to obtain synchronous reference frame current signals. The method includes capturing in the current signals an impedance generated by a rotor of the IPM machine, estimating a position of the rotor based on the impedance, and controlling the IPM machine based on the estimated rotor position. The impedance is captured at a low speed of the machine using a high-frequency signal injected into the stator windings.

In yet another embodiment, an alternator/starter system for an engine-powered vehicle includes an interior permanent magnet (IPM) machine having a stator and a salient rotor. A controller measures and vector-rotates stator terminal signals to obtain synchronous reference frame current signals, captures an impedance generated by the rotor in the current signals, estimates a position of the rotor based on the impedance, and controls the machine based on the estimated rotor position.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of various embodiments of the present invention is merely exemplary in nature and is in no way intended to limit the invention, its application, or uses.

Figure 1:
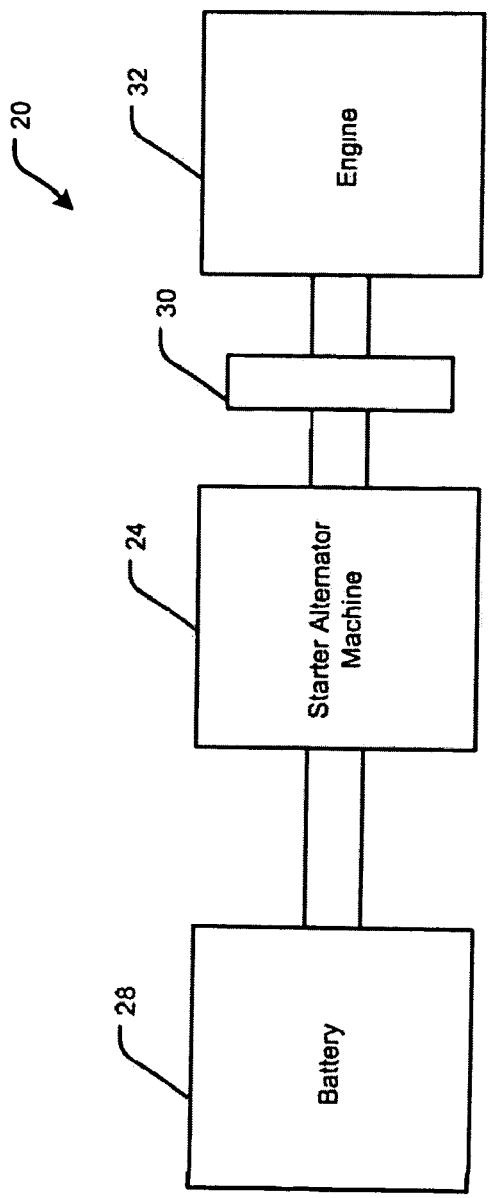
FIG. 1 is a diagram of an alternator-starter system for an engine-powered vehicle according to one embodiment of the present invention.

An embodiment of an alternator-starter system for an engine-powered vehicle is indicated generally by reference number 20 in FIG. 1. A starter-alternator machine 24 is powered by a battery 28, which may be, for example, a 42-volt battery. The system 20 is a belted alternator starter (BAS) system and thus includes a pulley/belt unit 30 between the machine 24 and an engine 32. In another embodiment, the system 20 may be an integrated starter generator (ISG) system in which the machine 24 is directly connected to the engine 32. The machine 24 provides engine cranking torque at low speeds and generation power over an entire speed range of the engine 32.

Figure 2:
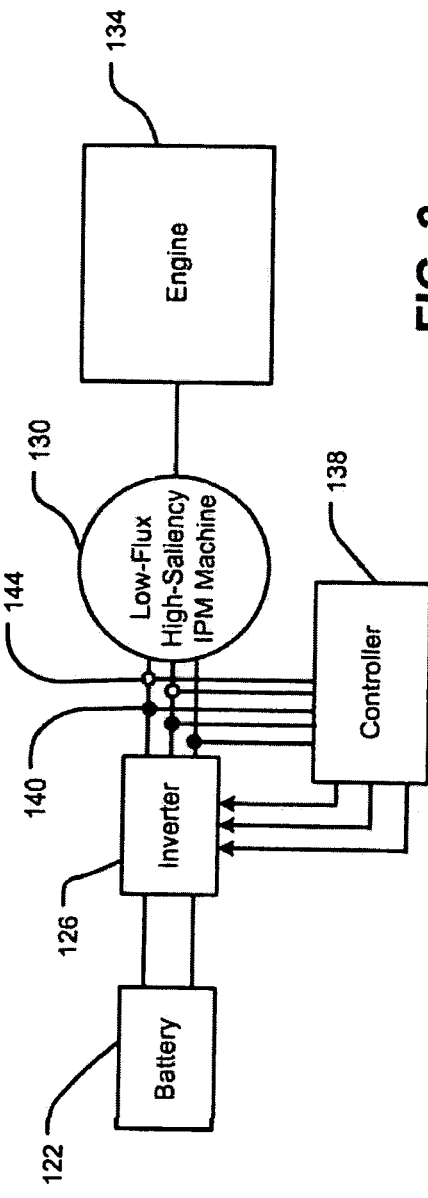
FIG. 2 is a diagram of an alternator-starter system for an engine-powered vehicle according to one embodiment of the present invention.

Another embodiment of an alternator-starter system for an engine-powered vehicle is indicated generally by reference number 120 in FIG. 2. A battery 122 is, for example, a 42-volt battery connected to an inverter 126. The inverter 126 converts direct voltage of the battery 122 to an alternating voltage for input to a machine 130. The machine 130 provides starting torque for cranking an engine 134 and also provides generation power for vehicle hotel loads. The machine 130 is, for example, an IPM machine that exhibits low flux and high saliency as further described below. The machine 130 may be directly integrated to the engine 134 in an ISG system, or may be belt-driven as in a BAS system, as previously described with reference to FIG. 1.

A controller 138 provides position-sensorless control for the machine 130 and the system 120. As further described below, the controller 138 uses voltages and currents measured via voltage sensing 140 and current sensing 144 to estimate a rotor position of the machine 130. The controller 138 uses the estimated rotor position for efficiency-optimized control for both low-speed engine cranking and high-speed power generation by the machine 130.

Figure 3:
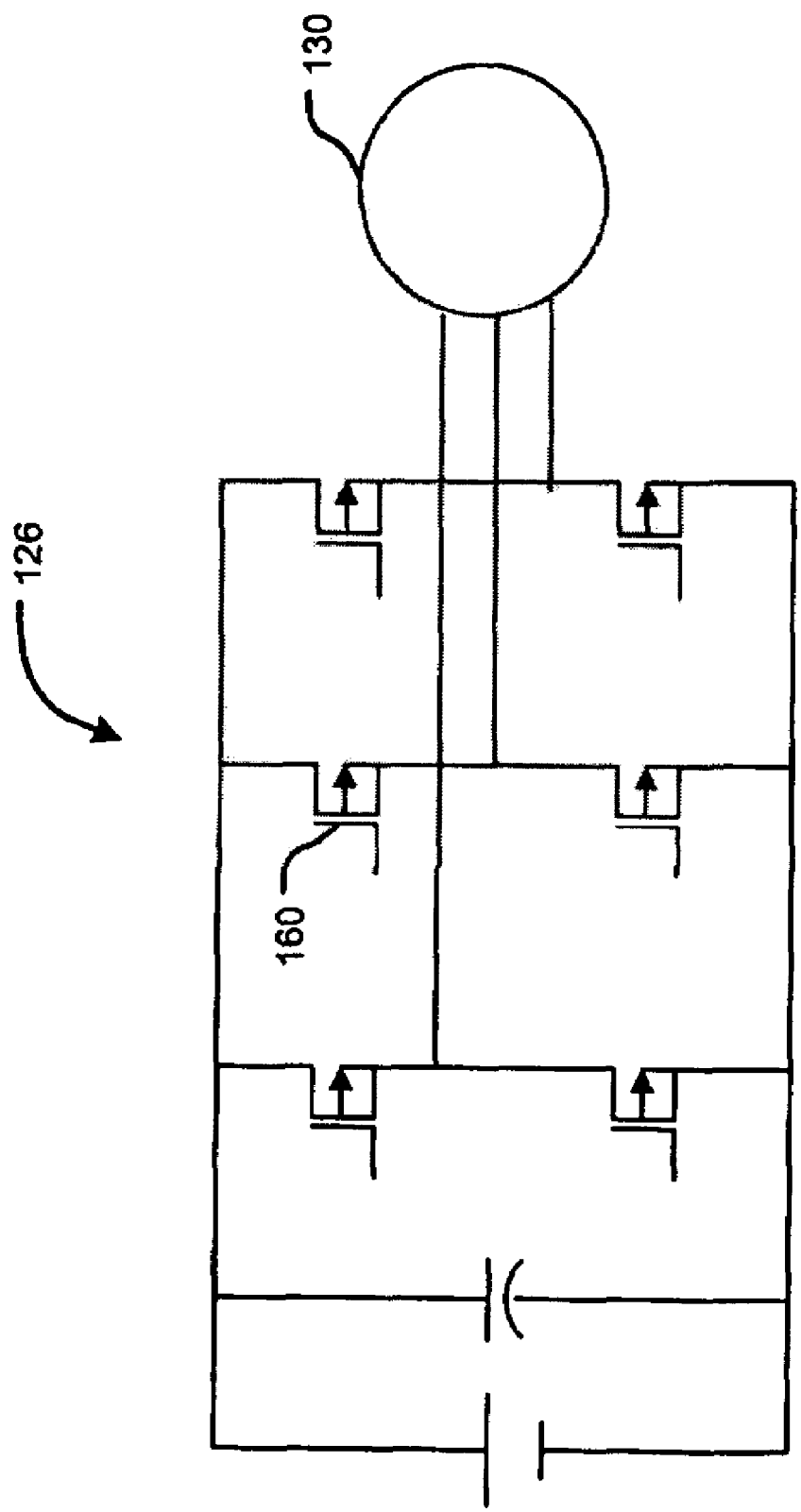
FIG. 3 is a diagram of the inverter and machine of the alternator-starter system shown in FIG. 2.

The inverter 126 is shown in greater detail in FIG. 3. The inverter 126 includes, for example, six MOSFET switches 160 in a Hexpak module from International Rectifier Corporation of El Segundo, Calif. and associated gate drive circuitry (not shown).

Figure 4:
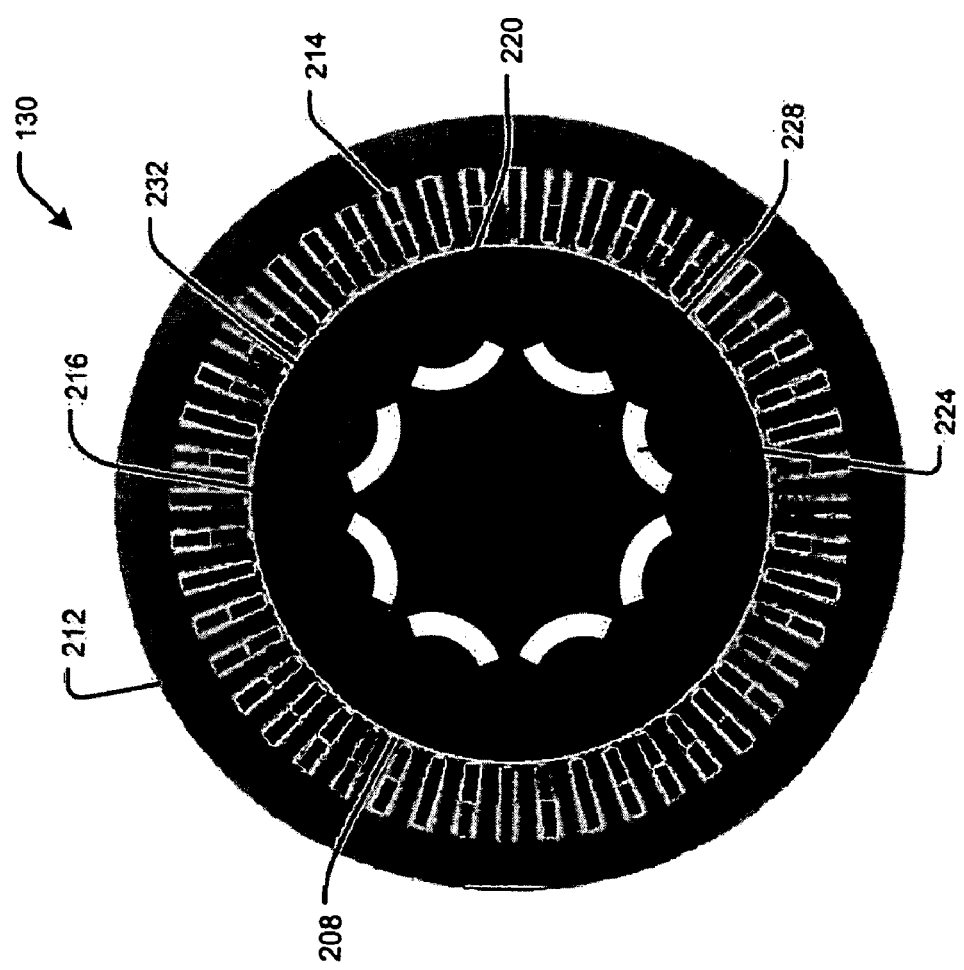
FIG. 4 is a cross-sectional view of an IPM machine in accordance with one embodiment of the present invention.

The machine 130 is shown in greater detail in FIG. 4. The machine 130 includes a rotor 208 and a stator 212 separated by an air gap 216. The stator 212 includes windings 214 and may be a short-pitched, distributed-winding stator the same as or similar to, for example, a stator used in an induction machine. The rotor 208 includes permanent magnets 220 inside slots or cavities 224 of the rotor 208. The magnets 220 are injection molded, although other types of magnets may be used.

The rotor slots 224 and magnets 220 are distributed in a plurality of barriers (also called layers) 228, for example, in three layers as shown in FIG. 4, to increase machine saliency. Generally, where machine saliency is high, magnetic flux in the air gap 216 can be kept weak. The rotor 208 is magnetized, for example, after the magnets 220 have been injected into the rotor 208. Reference is made to U.S. patent application Ser. No. 09/952,319 filed Sep. 14, 2001, U.S. patent application Ser. No. 10/140,918 filed May 7, 2002, U.S. patent application Ser. No. 10/087,236 filed Mar. 1, 2002, and U.S. patent application Ser. No. 10/431,744 filed May 8, 2003, assigned to the assignee of this application, and the disclosures of which are incorporated herein by reference in their entirety.

Shapes and placement of the barriers 228 are configured, for example, to maximize torque and minimize torque ripple. Additional information relating, for example, to magnetization and minimization of torque ripple in the machine 130 is available in the foregoing patent applications. Rotor cavities 224 which are sufficiently distant from an outer surface 232 of the rotor 208 such that magnetization of any magnetic material within them could be difficult or impossible are left empty of magnetic material. Magnetic flux in the air gap 216 is kept weak, to lower spin loss and reduce the possibility of faults.

Figure 5:
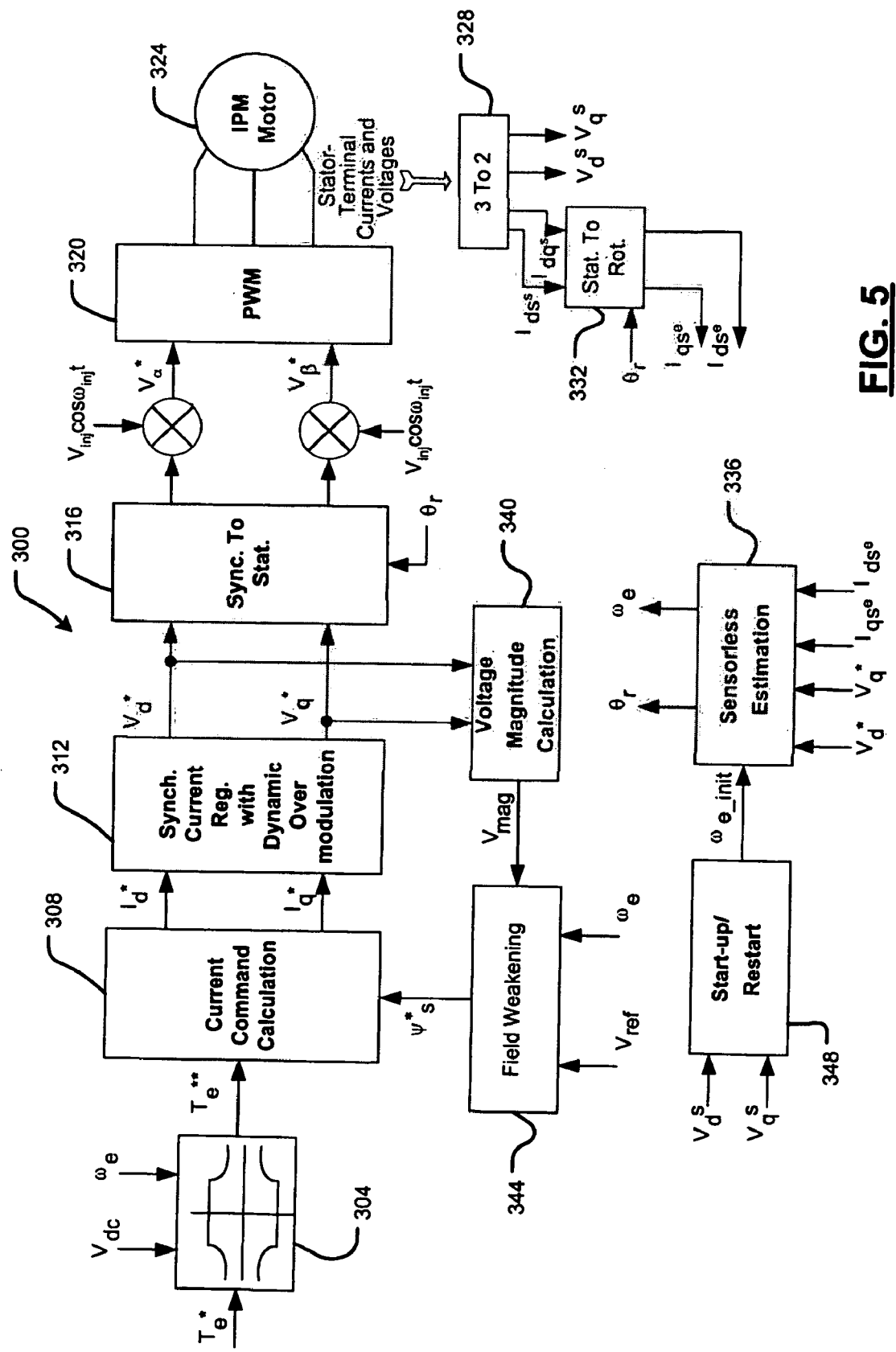
FIG. 5 is a diagram of an alternator-starter control system in accordance with one embodiment of the present invention.

An embodiment of an alternator-starter control system is indicated generally in FIG. 5 by reference number 300. A torque command $T_e^*$ is input to the control system 300 and is processed by a torque limiter module 304. The module 304 limits the torque command $T_e^*$ dependent on available DC link voltage $V_{dc}$ and estimated rotor angular velocity we. The angular velocity $\omega_e$ is estimated as further described below. The module 304 outputs a modified torque command $T_e^{}$. The modified torque command $T_e^{}$ and a stator flux command $\Psi^*_s$, generated as further described below, are used as indices to a current command calculation module 308 to generate d- and q-axis stator current commands $I_d^*$ and $I_q^*$. The current command calculation module 308 generates efficiency-optimized control parameters for engine cranking and for generation operation.

The commands $I_d^*$ and $I_q^*$ are input to a synchronous current regulation and dynamic over-modulation module 312 to generate voltage commands $V_d^*$ and $V_q^*$ in the synchronous reference frame. A synchronous-to-stationary transformation module 316 vector-rotates the command voltages $V_d^*$ and $V_q^*$ using an estimated rotor angular position $\theta_r$. The rotor angular position $\theta_r$ can be estimated without using a position sensor, as further described below.

Stationary voltages output by the transformation module 316 are injected with a high-frequency injection signal, e.g., $V_{inj} \cos \omega_{inj} t$ wherein $\omega_{inj}$ is about 1 KHz, to produce stationary-frame command voltages $V_\alpha^*$ and $V_\beta^*$. The voltages $V_\alpha^*$ and $V_\beta^*$ are input to a pulse-width modulation (PWM) inverter 320, which applies alternating three-phase voltages to stator windings of a high-saliency, low-flux interior permanent magnet (IPM) machine 324 as previously discussed with reference to FIG. 4.

Stator terminal phase currents and phase voltages are measured, e.g., sensed as previously discussed with reference to FIG. 2 and processed by a three-phase-to-two-phase transformation module 328. The module 328 outputs stationary frame currents $I_{ds}^s$ and $I_{qs}^s$ and voltages $V_d^s$ and $V_q^s$. A stationary-to-rotating frame transformation module 332 uses the estimated rotor angular position $\theta_r$ to generate synchronous reference frame feedback currents $I_{ds}^e$ and $I_{qs}^e$. As further described below, an embodiment of a position-sensorless estimation module 336 uses the commanded d- and q-axis voltages $V_d^*$ and $V_q^*$, feedback currents $I_{ds}^e$ and $I_{qs}^e$, and an initial angular speed $\omega_{e\_init}$ to estimate rotor position $\theta_r$ and angular velocity $\omega_e$.

A voltage magnitude module 340 calculates magnitude $V_{mag}$ of the stator voltages from the commanded voltages $V_d^*$ and $V_q^*$. A field-weakening module 344 uses the stator voltage magnitude $V_{mag}$ and a predefined reference voltage $V_{ref}$ to generate the stator flux $\Psi^*_s$. A startup/restart module 348 uses the measured stator terminal voltages $V_d^s$ and $V_q^s$ in the stationary reference frame and estimates an initial angular velocity $\omega_{e\_init}$. It also is contemplated that another method of estimating initial angular velocity $\omega_{e\_init}$ could be used in another embodiment.

Figure 6:
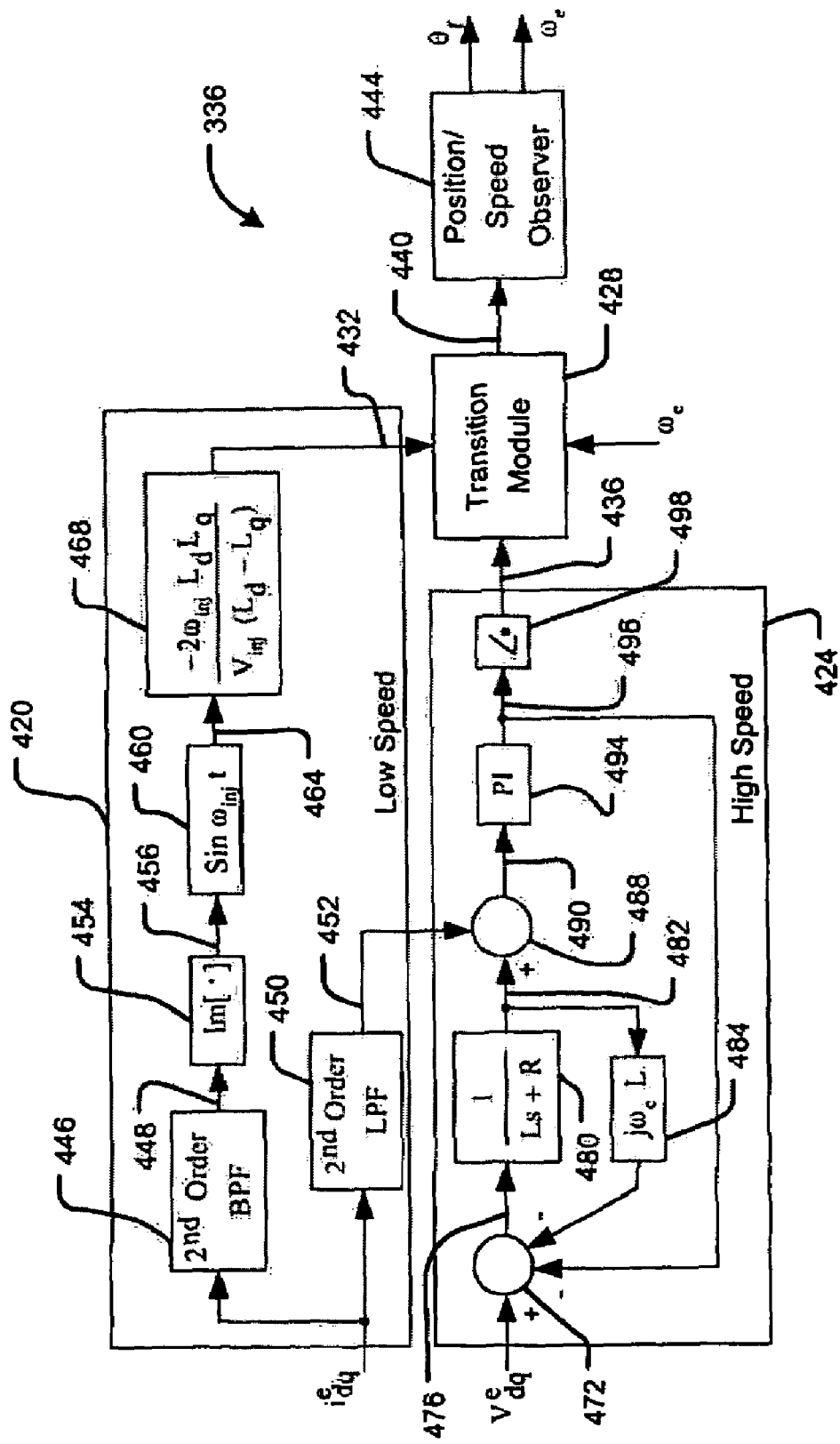
FIG. 6 is a diagram of a position estimating module of an alternator-starter control system in accordance with one embodiment of the present invention.

The position-sensorless estimation module 336 is shown in greater detail in FIG. 6. The module 336 uses two methods to estimate rotor position and angular velocity from commanded voltages and feedback currents. Specifically, the module 336 includes a low-speed module 420 for estimating a rotor electrical position $\theta_r$ at zero and low speeds of machine operation. A high-speed module 424 is used for estimating rotor position at high speeds of machine operation. The modules 420 and 424 are further described below. A transition module 428 merges outputs 432 and 436 of the modules 420 and 424 as a function of rotor speed $\omega_e$, a value for which may be obtained as further described below, to generate a position error signal 440. A position/speed observer module 444 uses the error signal 440 to estimate rotor position $\theta_r$ and angular velocity $\omega_e$.

More specifically, feedback currents $i_{qs}^e$ and $i_{ds}^e$ (shown in FIG. 6 as input current $i^e_{dq}$) and command voltages $V_d^*$ and $V_q^*$ (shown in FIG. 6 as input voltage $V^e_{dq}$) are input to the position-sensorless estimation module 336. In the low-speed module 420, input current $i^e_{dq}$ (in the synchronous reference frame) is processed through a second-order band-pass filter 446 to produce a signal 448. The current $i^e_{dq}$ also is processed through a second-order low-pass filter 450 to produce a signal 452 further described below.

Block 454 provides a signal 456 having an imaginary component, in the q-axis, of the signal 448. Rotor saliency of the machine 324 causes reactance of signals measured at stator terminals of the machine 324 to vary as a function of rotor position. The imaginary component of the signal 456 captures a high-frequency impedance of the injection signal $V_{inj}$, $\cos \omega_{inj} t$, injected into stator voltages (and vector-rotated with the stator currents at block 332) as described with reference to FIG. 5. At block 460, the signal 456 is multiplied by a signal $\sin \omega_{inj} t$, thereby producing a DC value in a signal 464. At block 468 the signal 464 is multiplied by a gain:

$$\frac{-2\omega_{inj} L_d L_q}{V_{inj}(L_d - L_q)}$$

where $\omega_{inj}$ represents the injected signal frequency, $L_d$ and $L_q$ represent inductance in the d-axis and q-axis, and $V_{inj}$ represents the injected signal voltage. The output signal 432 includes a rotor position estimate that is provided to the transition module 428.

Referring now to high-speed module 424, synchronous reference frame command voltage $V^e_{dq}$ is input, with other inputs further described below, to a summing block 472. A signal 476 output by block 472 is processed in block 480 to produce a an estimated synchronous stator current signal 482. Processing via block 480 is based on a stator voltage equation, specifically, $$I = \frac{V}{Ls + R}$$

where I represents stator current, V represents stator voltage, L represents stator inductance and R represents stator resistance. A voltage error signal is determined at block 484 in accordance with $V=j\omega_e LI$ is subtracted from the summing block 476, where a value for angular velocity $\omega_e$ may be obtained from the startup/restart module 348 and/or estimated by the position/speed observer module 444. The stator current signal 482 is input to a summing block 488. As described above, the current signal 452 is output by the low-pass filter 450. The filter 450 removes the high-frequency injection signal $V_{inj} \cos \omega_{inj} t$. The filtered signal 452 is subtracted from the summing block 488 to produce a signal 490, which is input to a proportional-integral (PI) control block 494 to produce a signal 496 representing a voltage phasor value. The signal 496 is processed at block 498 to produce the signal 436, which includes a rotor position estimate that is provided to the transition module 428 as described above. The signal 496 also is fed back to summing block 472, where it is subtracted from the command voltage $V^e_{dq}$.

The control method described above can be used to control the foregoing IPM machine to perform engine cranking with optimized efficiency and to perform power generation with maximized power and optimized efficiency. The machine has high torque density, thereby allowing system volume and mass to be reduced. Because the foregoing machine produces relatively low magnetic flux, spin losses are lowered and machine operation is fault-tolerant. The construction of the foregoing machine is well suited for volume production, thereby lowering the system cost. The foregoing system can provide high cranking torque and generation power over a wide speed range while also providing operational efficiency. The foregoing controller exploits features of the machine to provide efficient operation. Because position sensors are not used in the estimation module, reliability is improved and cost is reduced. The foregoing system provides improved performance compared to other systems, including but not limited to those using Lundell clawpole alternators, induction machines, switched reluctance machines, and/or other permanent magnet machines. The system utilizes a low battery voltage efficiently at high speed to provide high generating power with good efficiency, thereby reducing energy dissipation and improving gas mileage. Repeated cranking can be performed without much battery drainage and without exceeding the battery power limit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of controlling an IPM machine having a rotor and a stator, said method comprising:

measuring a stator terminal signal to obtain a measured signal;

rotating the measured signal to obtain a synchronous reference frame current signal;

estimating a rotor position based on an impedance generated using the rotor and included in the current signal; and using the estimated rotor position to control the machine.

2. The method of claim 1 further comprising:

vector-rotating a synchronous reference frame command voltage signal to obtain a stationary voltage;

injecting a high-frequency signal into the stationary voltage; and pulse-width modulating the stationary voltage to obtain the stator terminal signal.

3. The method of claim 2 wherein estimating a rotor position comprises:

filtering the synchronous reference frame current signal to obtain a signal having an imaginary component in the q-axis;

multiplying the imaginary component by a signal having a frequency the same as a frequency of the injected high-frequency signal to obtain a DC value; and applying a gain to the DC value.

4. The method of claim 3 wherein said gain comprises:

$$\frac{-2\omega_{inj} L_d L_q}{V_{inj}(L_d - L_q)}$$

where $\omega_{inj}$ represents a frequency of the injected signal, $L_d$ and $L_q$ represent inductance in d- and q-axes, and $V_{inj}$ represents a voltage of the injected signal.

5. The method of claim 1 wherein estimating a rotor position comprises:

using a synchronous reference frame command voltage signal to estimate a synchronous stator current; and using the estimated synchronous stator current to estimate the rotor position.

6. The method of claim 5 wherein using the synchronous reference frame command voltage signal comprises:
applying an error signal to the synchronous reference frame command voltage signal in accordance with V=jω$_e$LI to obtain a corrected voltage; and
processing the corrected voltage in accordance with $$I = \frac{V}{Ls + R}$$

to obtain the estimated synchronous stator current,
where I represents stator current, V represents stator voltage, L represents stator inductance and R represents stator resistance.

7. The method of claim 6 wherein using the estimated synchronous stator current comprises:
filtering the synchronous reference frame current signal to remove the high frequency signal;
summing the filtered current signal with the estimated synchronous stator current to obtain a summed current signal; and
controlling the summed current signal using a proportional-integral controller to estimate the rotor position.

8. The method of claim 1 wherein said estimating is performed without using a rotor position sensor.

9. The method of claim 1 further comprising placing a plurality of magnets into the rotor in a plurality of slots and leaving several of the slots empty to generate the impedance.

10. A method of providing cranking torque and power generation for an engine-powered vehicle using an alternator-starter system, said method comprising:
measuring and vector-rotating a stator terminal signal of an IPM machine of the alternator-starter system to obtain a synchronous reference frame current signal;
capturing in said current signal an impedance generated by a rotor of the IPM machine;
estimating a position of the rotor based on said impedance; and
controlling the IPM machine based on said estimated rotor position;
said impedance captured at a low speed of the machine using a high-frequency signal injected into the stator.

11. The method of claim 10 further comprising:
distributing a plurality of magnets in a plurality of slots in the rotor to form barriers; and
leaving several of the slots empty.

12. The method of claim 10 further comprising:
capturing said impedance at a high speed of the machine in accordance with $$I = \frac{V}{Ls + R}$$

to obtain an estimated synchronous stator current,
where I represents stator current, V represents stator voltage, L represents stator inductance and R represents stator resistance; and
processing said estimated synchronous stator current using a proportional-integral controller to estimate the rotor position.

13. The method of claim 12 further comprising merging a low-speed estimate of rotor position with a high-speed estimate of rotor position, said merging based on a speed of the machine.

14. An alternator/starter system for an engine-powered vehicle, said system comprising:
an interior permanent magnet (IPM) machine having a stator and a salient rotor; and
a controller that:
measures and vector-rotates a stator terminal signal to obtain a synchronous reference frame current signal;
captures an impedance generated by said rotor in the current signal;
estimates a position of said rotor based on the impedance; and
controls said machine based on the estimated rotor position.

15. The alternator/starter system of claim 14 wherein said controller:
captures a low-speed impedance using a first algorithm and a high-speed impedance using a second algorithm; and
merges outputs of the algorithms based on a speed of said machine to estimate said rotor position.

16. The alternator/starter system of claim 15 wherein said controller uses a high-frequency signal injected into said stator to capture the low-speed impedance and a synchronous reference frame command voltage signal to capture the high-speed impedance.

17. The alternator/starter system of claim 14 wherein said rotor comprises a plurality of barriers formed by a plurality of magnets in slots, and wherein several slots are left empty.

18. The alternator/starter system of claim 14 wherein said magnets comprise injection molded magnets.

* * * * *